United States Patent [19]
Keyson

[11] Patent Number: 6,075,515
[45] Date of Patent: Jun. 13, 2000

[54] VIRTUAL WORKSPACE FOR TACTUAL INTERACTION

[75] Inventor: David V. Keyson, Eindhoven, Netherlands

[73] Assignee: U.S. Philips Corporation, New York, N.Y.

[21] Appl. No.: 09/003,278

[22] Filed: Jan. 6, 1998

[30] Foreign Application Priority Data

Jan. 10, 1997 [EP] European Pat. Off. .............. 97200065

[51] Int. Cl.[7] ...................................................... G09G 5/00
[52] U.S. Cl. ........................................... 345/156; 345/158
[58] Field of Search ..................................... 345/167, 164, 345/161, 163, 158, 156, 157, 339, 328, 427, 435, 348, 349, 350, 351, 352, 353, 354; 348/734, 553

[56] References Cited

U.S. PATENT DOCUMENTS

| | | | |
|---|---|---|---|
| 5,488,391 | 1/1996 | Favot et al. ............................. | 345/156 |
| 5,515,078 | 5/1996 | Greschler et al. ...................... | 345/156 |
| 5,691,737 | 11/1997 | Ito et al. ................................. | 345/8 |
| 5,943,042 | 8/1999 | Siio ........................................ | 345/172 |

FOREIGN PATENT DOCUMENTS

| | | |
|---|---|---|
| 0489469A1 | 6/1992 | European Pat. Off. . |
| 0489469A1 | 10/1992 | European Pat. Off. . |
| WO9200559 | 1/1992 | WIPO . |
| WO9607965 | 3/1996 | WIPO . |
| WO9607965 | 6/1996 | WIPO . |
| WO9628777 | 9/1996 | WIPO . |
| WO9635161 | 11/1996 | WIPO . |

*Primary Examiner*—Richard A. Hjerpe
*Assistant Examiner*—Jean Lesperance
*Attorney, Agent, or Firm*—Brian J. Wieghaus

[57] ABSTRACT

The invention, relates to a method for enabling a user to input messages into a data prossing system. To each message a respective target zone (202) in a virtual workspace (200) is allocated. A tactual representation of the virtual workspace is generated by applying forces to a member of an input device which has a housing with respect to which the member is user-manipulatable. Manipulations of the member are converted to locations of a control object in the virtual workspace (200). On the basis of the tactual representation the user can navigate through the virtual workspace. A message is selected for input in response to a movement of the control object to a corresponding one of the respective target zones (202). The target zones (202) are arranged in the virtual workspace (200) around a central zero zone (204) being a preferred zone of the control object, such that the target zones (202) have substantially no tangential overlap among one another with respect to the zero zone (204).

20 Claims, 3 Drawing Sheets

VIRTUAL WORKSPACE FOR TACTUAL INTERACTION

BACKGROUND OF THE INVENTION

The invention relates to a method for enabling a user to input a plurality of messages into a data process system, the method comprising the steps of: allocating to each message a respective target zone in a virtual workspace; presenting a tactual representation of the virtual workspace by applying forces to a member of an input device which has a housing with respect to which the member is user-manipulatable; converting manipulations of the member to locations of a control object in the virtual workspace; selecting one of the messages for input in response to a movement of the control object to a corresponding one of the respective target zones.

A data processing system in which such a method can advantageously be employed has been disclosed in United States patent application Ser. No. 08/678115, corresponding to European patent EP 0 489 469. The reference describes an apparatus, such as a PC, comprising an input device for inputting coordinates of a control object with respect to a virtual workspace and a display for presenting a visual representation of the virtual workspace. The location of the control object in the virtual workspace is indicated by a cursor on the display. The cursor and the visual representation of the virtual workspace establish a form of visual feedback, supporting the user in the process of moving the control object through the virtual workspace. Further support is provided by actual feedback in the form of a tactual representation of the virtual workspace consisting of forces on the member of the input device favouring the presence of the control object in certain preferred areas.

On a higher level, a method according to the preamble allows inputting messages such as commands, responses to system prompts, etc. Thereto, a number of such preferred areas are used as target zones being allocated to the respective messages, as set out in the preamble. The target zones together establish a kind of menu, each target zone enabling selection of a corresponding message for input upon moving the control object thereto. The visual feedback and tactual feedback then serve to facilitate the process of capturing the target zones.

In some cases, however, the use of visual feedback is not an option, e.g. in case of a data processing system for visually impaired users, or simply because a display would be too expensive. Alternatively, when the user is already heavily loaded with visual data, or when a low complete interaction process with the data processing system is required, which is often the case with consumer systems, the use of visual feedback should be resisted as much as possible.

A problem, though, is that simply leaving out the visual feedback yields, in general, a virtual workspace in which the user easily gets lost, due to the complexity of the virtual workspace.

SUMMARY OF THE INVENTION

It is, inter alia, an object of the invention to provide a method according to the preamble, enabling the user to find his way in the virtual workspace on the basis of the corresponding tactual representation.

To this end, a method according to the invention is characterized by arranging the target zones around a central zero zone being a preferred zone of the control object, such that the target zones have substantially no tangential overlap among one another with respect to the zero zone. A target zone is said to be tangentially overlapping an other target zone if it blocks straight lines between the central zero zone and the other tet zone. User-led control movement sums from the zero zone and is directed outwards towards the tactually perceptible target zones. The zero zone, due to its central location, can be easily recovered from any position, rhe non-overlapping target zones on the other hand, as they are not blocking one another, are within easy and direct reach from the zero zone without having to bypass undesired target zones. These aspects of the invention make navigation through the virtual workspace vary simple, removing the need for additional visual feedback to the user. A further advantage of the method is that the distance at which the interface can be controlled is not dependent on the viewing distance for graphics.

Advantageously, the method is characterized by applying a force to the member if the control object is located near to the zero zone, said force apparently provoking a movement of the control object in a direction towards the zero zone. In this way, the control object is driven to the zero zone, further facilitating easy recovery of the zero zone requiring minimal user action.

Advantageously, the method is characterized by applying a force to the member if the control object is located near to a particular get zone, said force apparently provoking a movement of the control object in a direction towards that particular target zone. This considerably facilitates capturing the target zones.

Advantageously, the method is characterized by playing an auditory cue if the control object is located near to a particular target zone, said auditory cue being characteristic of the message corresponding to that particular target zone, In this way, the user can identify a particular target zone without having to recognize a corresponding visual representation. This can be particularly handy in applications of the method for visually impaired users.

Advantageously, the method is characterized by generating a visual representation of the virtual workspace and the control object on a display. In this way additional information can be presented to the user, further helping him to find his way in the virtual workspace. Multimodal feedback, i.e. the simultaneous use of several forms of feedback, provides a robust control method which is easy to use for a wide range of users. The tactual, auditory and visual information help guide the user towards messages. Multimodal feedback could assist users with limited visual, hearing or motorial capacity. Young children, who may not be able to read, could spatially find their way to a particular message.

Advantageously, the method is characterized by selecting a particular message for input if the control object is held at least a minimum amount of time in a corresponding target zone. This has the advantage that a button can be saved, thus further reducing complexity of inputting messages.

Advantageously, the method is characterized by arranging the target zones in multiple two-dimensional layers, "multiple" signifying two or more. This allows having the messages organized in a hierarchy of layers, each layer grouping together similar messages. An advantage hereof is that the user gets a better overview of the possible messages. A further advantage is that less messages are simultaneously presented to the user, thereby simplifying the required user actions for inputting a particular message.

Advantageously, the method is characterized in that it is applied in a data processing environment comprising a trackball with force feedback. This allows the method to generate forces creating the illusion that the member is a ball located in a dish-like workspace, with holes in its walls corresponding to respective target zones. Such a natural metaphor of the interaction process is easy to comprehend for the user. A trackball with force feedback is disclosed in aforementioned European patent.

The method is particularly well suited for application in a data processing environment for receiving television signals, the input messages comprising commands for selection of respective channels or channel sets. An advantage of the method is that the method allows the channels to be organized into sets of related channels, thereby facilitating access to the channels. Another advantage of the method in this respect is that the user does not have to direct his visual attention to menus or to buttons, he can tactually navigate through the available channels and keep on watching the active channel at the same time.

The invention also relates to a data processing system suited for application of a method according to the invention.

Further advantageous aspts of the invention can be found in dependent claims.

Relevant material to the present invention can be found in United States patent applications Ser. No. 08/523069 and 08/615559, corresponding with European patent applications 95927930.8 and 96901460.4, respectively, all assigned to the present applicant.

The invention is further explained below by way of example, with reference to the accompanying drawing.

DESCRIPTION OF THE PREFERRED EMBODIMENTS

Figure 1:
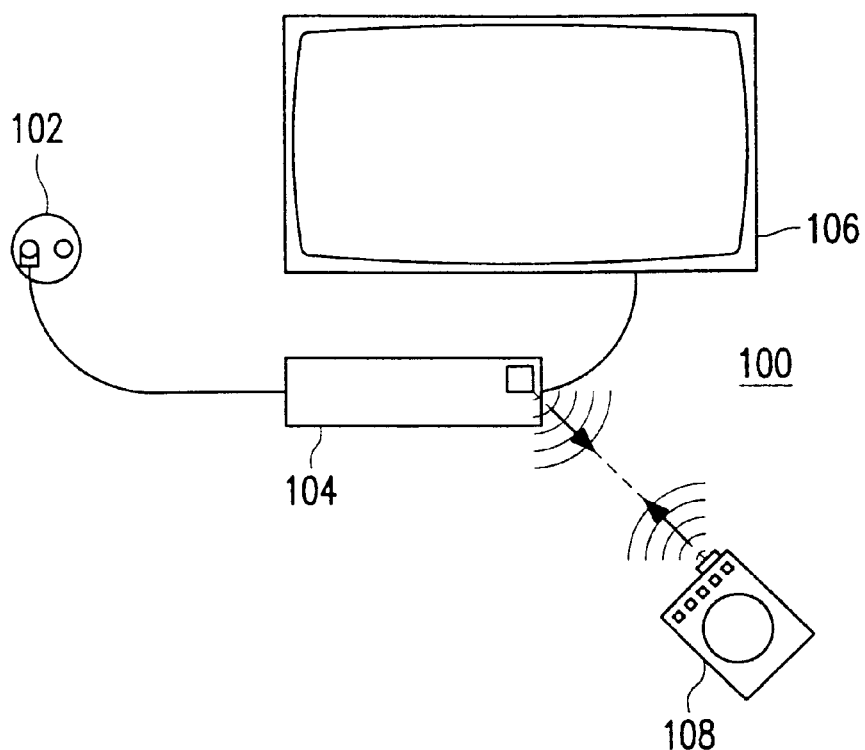
FIG. 1 shows a widely used data processing system in which the invention can advantageously be applied.

FIG. 1 shows a data processing system 100 in which the invention can advantageously be applied. It is a system for presenting to the user television data entering his ling room via a wall plug 102 after being transmitted to him by a service operator via a cable, terrestrial, satellite link, or otherwise. This system, further referred to as TV system, comprises a set-top box 104 and a television set 106, the set-top box converting the transmitted signal to a TV-signal that can be fed to the television set 106.

Messages that the user is likely to be willing to input into the TV system are, amongst others, messages for changing the active channel, being the channel that is presented in a full screen view and is he in the foreground as the single auditory source. Most often, the user does this by typing the unique number associated to the channel of his choice on a remote control 108, working for example on the principle of infrared light or ultrasound. Consequently, he has to remember an ever increasing list of number, that list also being likely to change from time-to-time when the operator reorganizes the available bandwidth. Alternatively, to each channel could be allocated a respective target zone in a two-dimensional virtual workspace such that a visual presentation of the virtual workspace on the TV screen would comprise a matrix of channel icons. Selection of a particular channel is accomplished by moving a control object over the corresponding target zone (or, in terms of the visual context, by moving a cursor over rh: corresponding channel icon) with the aid of a two-dimensional coordinate input device, like a trackball or joystick, integrated ill the remote control 108. This interaction method is equivalent t well-known schemes for inputing messages in window-based PC applications with the aid of a mouse device.

The visual feedback overcomes the problem of having to remember the channel numbers associated to the channels. On the other hard, the visual feedback is essential for placing the cursor on the icon. This is generally found to be a tedious operation. Discerning the icons and correct placement of the cursor on the icon of choice puts a heavy load on the visual system of the user. Moreover, the unnatural mixture of tactual input and visual feedback makes this way of interacting with the TV system unnecessarily complex for the average TV user. This problem can be somewhat alleviated if additionally the user is supplied with tactual feedback in the form of forces on the member of the input device, thus facilitating the placement of the control object over the channel to be selected. Hereto, the remote control 108 should comprise an input device, e.g. a trackball, with force feedback. However, with such an input device, a method for inputting messages according to the invention more adequately uses the tactual feedback.

Figure 2:
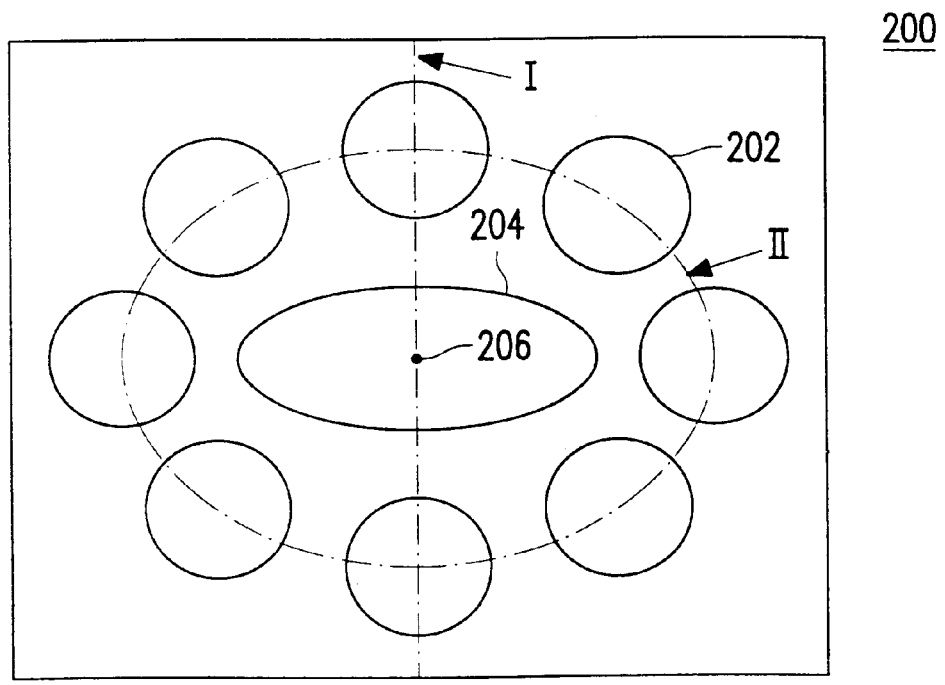
FIG. 2 shows the arrangement of target zones and zero zone in the virtual workspace according to a preferred embodiment of the invention.

FIG. 2 shows the arrangement of target zones 202 and zero zone 204 in the virtual workspace 200 according to a preferred embodiment of the invention. The user can tactually navigate with a control object through the virtual workspace by manipulating the trackball integrated in the remote control 108. At the same time, the user experiences a force on the trackball as a function of the location of the control object in the virtual workspace. This force field composes a tactual representation of the virtual workspace. The control object is initially located at the centre point 206 of the virtual workspace. Upon moving the control object into a pacular target zone and keeping the control object the for two seconds, the message associated with that particular target zone is selected for input. Alternatively, selection could be accomplished by pressing a button after placement of the control object in that particular target zone. The organization of the virtual workspace 200 and the corresponding force field make the target zones 202 and the zero zone 204 easily accessible.

A way to relate to each position in a plane a two-dimensional force is by defining a scalar potential field, the gradient of which at a certain location is a measure of the coresponding force in such a way that the force is in the direction of maximal decrease in potential. Following this approach, the closed lines in FIG. 2, delimiting the target zones and the zero zone, also represent contour lines around local minima of the potential field. When approaching the zero zone or a target zone, a tactual "hole" can be felt into which the control object appears to sink.

Figure 3:
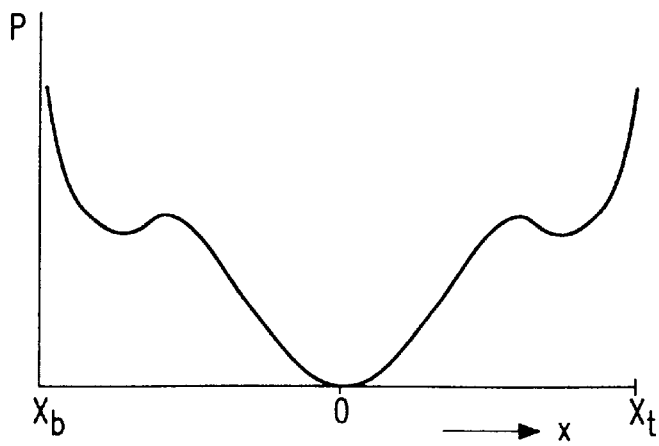
FIG. 3 shows a diagram illustrating the potential field as a function of vertical position along cross-section I of FIG. 2, according to the preferred embodiment.

FIG. 3 shows a diagram illustrating the potential field as a function of vertical position along cross-section I of FIG. 2, according to the preferred embodiment, with parameter x running from the bottom $x_b$ to the top $x_t$ of the virtual workspace.

Figure 4:
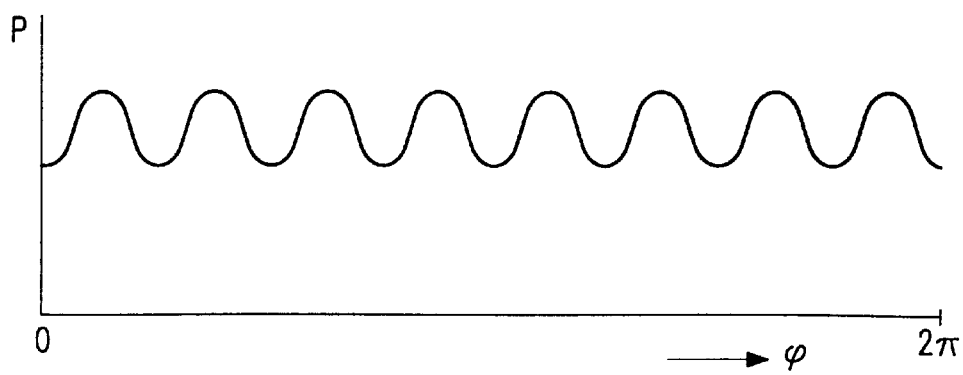
FIG. 4 shows a diagram illustrating the potential field as a function of rotation angle along cross-section II of FIG. 2, according to the preferred embodiment.

FIG. 4 shows a diagram according to the preferred embodiment illustrating the potential field as a function of rotation angle α along cross-section II of FIG. 2, according to the preferred embodiment. When radial paths from the zero zone, intersecting a target zone, are substantially less steep than neighbouring paths, preferred paths are created, further facilitating the capture of the target zones.

The potential field of the preferred embodiment has a dish-like shape, with the bottom corresponding to the zero zone, centrally located in the virtual workspace. The derived forces on the trackball consequently give the user the impression that, instead of manipulating the trackball, he is moving a ball that is initially located on the bottom of a virtual dish. When the trackball is released or after a selection has been made, the control object reassumes its sing position in the zero zone at the bottom of the virtual dish. From that position, all target zones are easily accessible. The use of such intuitive navigational guidance considerably lowers the complexity of the interaction process. Alternatively, the potential field could also comprise equipotential zones.

Up to now, we have not stated what land of messages are allocated to the target zones of FIG. 2. A straightforward and obvious choice would be to simply allocate a target zone to each available channel. This could very well work in the situation that the number of available channels is sufficiently low, say, not more than 8. Nowadays, however, the number of channels available to most TV users is rather large and still increasing, certainly in the light of the advent of digital television broadcast. Consequently, if each channel has a respective target zone allocated to it, all target zones being simultaneously presented to the user, this would lead to a virtual workspace that is very densely packed with target zones, which is disadvantageous to the user's overview on the available channels and at the same time require very precise movement of the trackball.

In the preferred embodiment, the number of target zones that are simultaneously presented is limited, thereby restraining the dexterity required from the user in handling the trackball. Hereto, the available channels are classed in a number of categories, e.g. Sports, News, Music, Movies, Children, etc. Two layers in the virtual workspace are distinguished, both being organized in a way similar to FIG. 2. At a first layer of the virtual workspace, the target zones are allocated to categories. More precisely, the target zones at the first layer are allocated to messages telling the TV system to make available the channels peraing to that category. At a second layer, the target zones correspond to the channels pertaining to one category only, the number of which being of course considerably lower than the total number of available channels. After selection of a particular category, the control object enters the second layer, on which the channels pertaining to the selected category are presented. Then, the user can select the channel of his choice. As was stated before, selection of a particular message for input (be it a message for selecting a channel or a message for selecting a category) is accomplished by keeping the control object for at least 2 seconds in the corresponding target zone, at both the first and the second layer, the user benefits from the particular arrangement of the target zones and zero zones, as shown in FIG. 2, in combination with the tactual feedback as derived from the potential field as shown in FIGS. 3 and 4. Switching between the layers is accomplished by pressing a button. Alternatively, in this more or less three-dimensional arrangement of layers, a three-dimensional input device, such as described in (PHN 15232), can be used. With such a device, alternative ways of stepping through the various layers can be implemented (see reference for examples).

When the system is switched on, the preferred or the latest channel is active. The control object is positioned in the zero zone of the first layer of the virtual workspace and the user is able to select an alternative category. By pressing the button he can switch to the second layer without changing the present category. On die second layer, he can select the channel of his choice or, alternatively, by pressing the button again he can return to the first layer.

According to the preferred embodiment, the tactual feedback is supplemented with auditory feedback. This feedback is presented in the form of audio cues, representative of the target zones. When the control object approaches a particular target zone, a corresponding auditory cue is played in the background, for example laughing children upon approaching the category Children, or part of the CNN tune when approaching the target zone corresponding to the CNN channel. Further movement of the control object towards a target zone causes a "whosh" sound, announcing che entering of that target zone. These sounds are mixed with the sound of the active channel and the relative sound levels depend on the distance of the control object to the target zone. Alternatively, instead of playing a static cue when approaching a target zone corresponding to a channel, it could be possible to present the actual sound of that channel as it is broadcasted at that moment.

Figure 5:
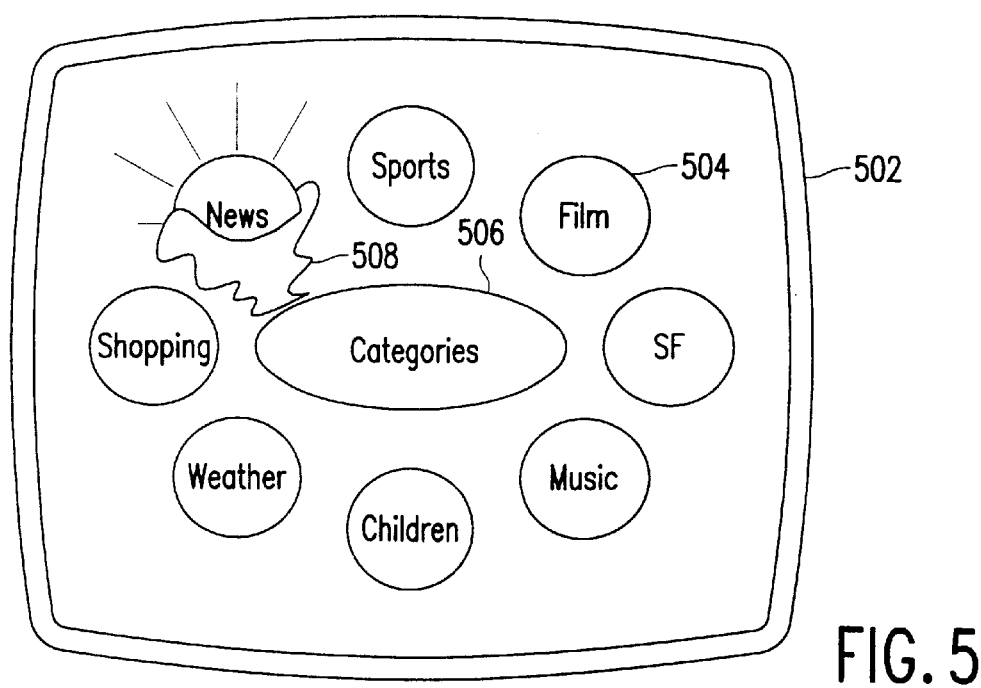
FIG. 5 shows how, in the preferred embodiment, also visual feedback is presented to the user.

FIG. 5 shows how, in the preferred embodiment, also visual feedback is presented to the user. Upon a movement of the trackball, a graphical representation of the first layer of the virtual workspace is overlaid on a TV screen 502, without severely disturbing the viewing of the current selected channel. The target zones are represented by coloured bodies 504 containing the name of respective available categories. Instead of, or additional to the names, descriptive graphics of the categories could be used. When the control object is located at the second layer, a similar representation is generated thereof. At the central zero zone 506, the current layer is indicated, in this case the first layer containing the categories. Alternatively, the name of the current category is displayed when the control object is at the first layer, and the name of tie active channel is displayed when the control object is at the second layer. Initially, the central zero zone is in focus and is highlighted. Upon approaching a target zone, that target zone comes into focus and is highlighted. Further movement of the control object towards that target zone causes a "blob"-like animation 508 of the control object enclosing the target zone to be shown, accompanying the "whosh" sound. A few seconds after releasing the trackball test aspects of the visual feedback disappear and the TV screen only displays the active channel. This third form of feedback further facilitates the user to browse through the available channels.

Figure 6:
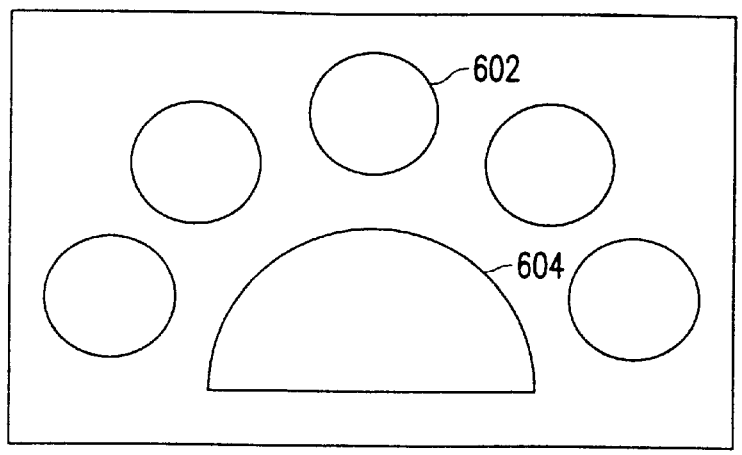
FIG. 6 shows an alternative arrangement of the target zones and zero zone in the virtual workspace.

FIG. 6 shows an alternative arrangement of the target zones 602 and zero zone 604. Alternatively, for aesthetic considerations related to the visual representation of the visual workspace, the zero zone could also be located in a corner of the virtual workspace or elsewhere, as long as it has a substantially central location with respect to the target zones.

Figure 7:
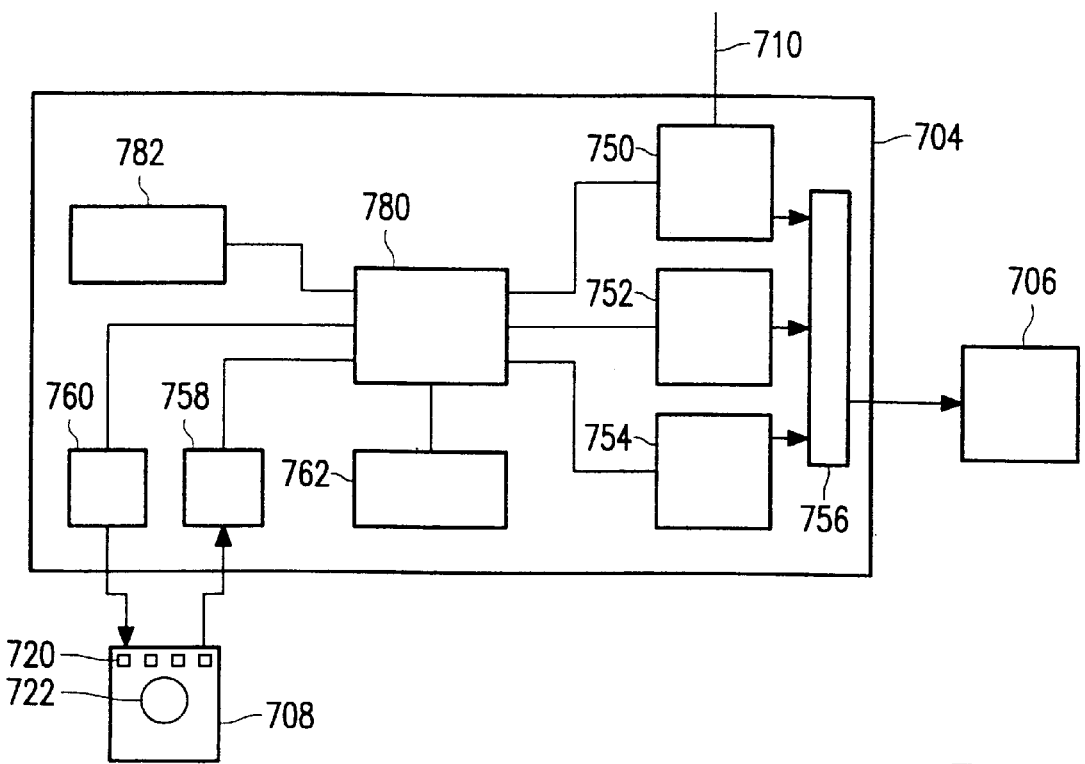
FIG. 7 shows how the TV system of FIG. 1 can be rearranged according to the, preferred embodiment of the invention.

FIG. 7 shows a TV system comparable to the one of FIG. 1, arranged according to the preferred embodiment of the invention. At this point it should be mentioned that, for the invention, it is not essential that the functionalities of set-top box and television set are put into separate boxes; they can be integrated into one box, or, alternatively, be distributed over The boxes in a different manner. The TV system comprises a set-top box 704, a TV set 706 and an input device 708. The set-top box receives a transmitted signal from a service provider via link 710. The set-top box generates a TV signal that is subsequently fed to TV set 706 through link 712. In the preferred embodiment, the user can interact with the TV system through remote control 708, comprising multiple buttons 720 and a trackball 722 arranged for providing tactual feedback. The remote control is arranged for two-way communication with the set-top box 704, the remote control sending to the set-top box signals in response to manipulations of the trackball and the set-top box sending signals to the remote control for controlling the force applied to the trackball.

In the preferred embodiment, set-top box 704 comprises the necessary means for implementing the invention. As the details of the invention have already been extensively discussed in connection with the previous figures, only a concise overview of these means is given.

A decoder 750 is provided for demultiplexing and decoding a single channel from the multiple channels received via link 710. Graphics generator 752 and audio generator 754 are arranged for generating a visual and an auditory representation of the virtual workspace, respectively. The output signals from the decoder 750, graphics generator 752 and audio generator 754 are mixed by mixer 756 and presented to the TV set 706 in the form of a TV signal. Location translator 758 is provided for converting manipulations of the member to coordinates of a control object in the virtual workspace on the basis of the signals it receives from the remote control 708. Force generator 760 is arranged for sending signals to the remote control for controlling the force applied to the trackball. Message selector 762 is arranged for detecting the uninterrupted presence of the control object into a particular target zone for at least two seconds, and thereupon selecting the corresponding message. The decoder 750, graphics generator 752, audio generator 754, location translator 758, force generator 760 and message selector 762 are under control of a microcontroller 750, that microcontroler 780 being, further connected to a memory 782 for storing code describing attributes of the virtual workspace and software programs. The attributes comprise, for instance, graphic elements of the visual presentation of the vial workspace, the auditory cues and the coordinates and dimensions of the target ones. The software program controls the operation of the set-top box. Additionally, the software program could take over one or more tasks that were assigned to one or more restive blocks described in this paragraph.

The programming of diverse aspects of the virtual workspace can be left to the user and/or is done dynamically, the latter meaning that the virtual workspace is adjustable by the service operator, or that certain aspects of the virtual workspace are adjusted automatically in the course of use according to the measured preferences of the user. For instance, if the operator chooses to add a channel, information is sent along with the television data, automatically inserting the new channel in the appropriate category menu. Or, when after some time the set-top box has noticed that the user is a sports fan, the presentation and ease of selection of the sports category and sports channels could be enhanced.

Other messages that the user would like to input into the TV system regard user preferences with respect to adjustable system-options. Hereto, it could be advantageous to arrange the virtual workspace to have at least three layers, a third layer comprising a menu of adjustable system-options.

I claim:

1. A method for enabling a user to input a plurality of messages into a data processing system, the method comprising the steps of; allocating to each message a respective target zone in a virtual workspace; presenting a tactual representaton of the virtual workspace by applying forces to a member of an input device which has a housing with respect to which the member is user-manipulable; covering manipulations of the member to locations of a control object in the virtual workspace; selecting one of the messages for input in response to a movement of the control object to a corresponding one of the respective target zones; characterized by arranging the target zones around a central zero zone being a preferred zone of the control object, such that the target zones have substantially no tangential overlap among one another with respect to the zero zone.

2. A method as claimed in claim 1, characterized by applying a force to the member if the control object is located near to the zero zone, said force apparently provoking a movement of the control object in a direction towards the zero zone.

3. A method as claimed in claim 1, characterized by applying a force to the member if the control object is located near to a particular target zone, said force apparently provoking a movement of the control object in a direction towards that particular target zone.

4. A method as claimed in claim 1, characterized by playing an auditory cue if the control object is located near to a particular target zone, said auditory cue being characteristic of the message corresponding to that particular target zone.

5. A method as claimed in claim 1, characterized by generating a visual representation of the virtual workspace and the control object on a display.

6. A method as claimed in claim 5, characterized by visually marking a particular target zone if the control object is located near to that particular target zone.

7. A method as claimed in claim 1, characterized by selecting a particular message for input if the control object is held at least a minimum amount of time in a corresponding target zone.

8. A method as claimed in claim 1, characterized by selecting a particular message for input if the control object is located in a corresponding target zone and a button on the input device is pressed.

9. A method as claimed in claim 1, characterized by arranging the target zones in multiple two-dimensional layers.

10. A method as claimed in claim 1, characterized in that it is applied in a data processing environment comprising a trackball with force feedback.

11. A method as claimed in claim 1, characterized in that it is applied in a data processing environment for receiving television signals and that the input messages are respective commands for selection of respective channels or channel sets.

12. A data processing system comprising: an input device comprising a housing and a member that is user-manipulatable with respect to the housing; a location translator for converting manipulations of the member to locations of a control object in a virtual workspace comprising a plurality of target zones representing respective messages; a force generator for applying to the member forces composing a tactual representation of the virtual workspace; a message selector for in response to a movement of the control object to one of the target zones selecting a corresponding one of the respective messages, characterized in that the virtual workspace further comprises a zero zone being a preferred zone of the control object, around which the target zones are arranged such that they have substantially no tangential overlap among one another with respect to any position in the zero zone.

13. A data processing system as claimed in claim 12, characterized in that the force generator is arranged for, if the control object is located near to the zero zone, generating a force acting on the member and apparently provoking a movement of the control object in a direction towards the zero zone.

14. A data processing system as claimed in claim 12, characterized in that the force generator is arranged for, if the control object is located sufficiently near to a particular target zone, generation, a force acting on the member and apparently provoking a movement of the control object in a direction towards that particular target zone.

15. A data processing system as claimed in claim 12, characterized in that an audio generator is provided for, if the control object is located near to a particular target zone, playing an auditory cue, characteristic of that particular target zone.

16. A data processing system as claimed in claim 12, further comprising a display and a graphics generator for display of a visual representation of the control object and the virtual workspace.

17. A data processing system as claimed in claim 12, characterized in that the message selector is arranged for, if the control object is held a minimum amount of time in a particular the target zone, selecting the corresponding message.

18. A data processing system as claimed in claim 12, the input device further comprising a button, characterized in that the message selector is arranged for, if the control object is located in a particular target zone and the button is pressed, selecting the corresponding messages.

19. A data processing system as claimed in any of claims 12, characterized in hat the input device is a trackball with force feedback.

20. A data processing system as claimed in any of claims 12, characterized in that the data processing system is arranged for receiving television signals and that the input messages are respective commands for selection of respective channels or channel sets.

\* \* \* \* \*